(12) United States Patent
Lepage et al.

(10) Patent No.: US 11,046,239 B1
(45) Date of Patent: Jun. 29, 2021

(54) TAIL LIGHT ASSEMBLY

(71) Applicant: Honda Motor Co., Ltd., Tokyo (JP)

(72) Inventors: Christopher T. Lepage, Marysville, OH (US); Nathan M. Fisher, Dublin, OH (US); Kevin A. Veverka, Columbus, OH (US); Edward W. Bach, Marysville, OH (US); Edouard S. Sandoz, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/744,729

(22) Filed: Jan. 16, 2020

(51) Int. Cl.
| F21S 43/20 | (2018.01) |
| B60Q 1/26 | (2006.01) |
| B60Q 1/30 | (2006.01) |
| B60J 7/16 | (2006.01) |
| B60J 10/00 | (2016.01) |

(52) U.S. Cl.
CPC .......... B60Q 1/2661 (2013.01); B60J 7/1607 (2013.01); B60J 10/45 (2016.02); B60Q 1/2626 (2013.01); B60Q 1/30 (2013.01); F21S 43/26 (2018.01)

(58) Field of Classification Search
None
See application file for complete search history.

(56) References Cited

U.S. PATENT DOCUMENTS

| 4,420,797 A | 12/1983 | Tohata |
| 5,150,939 A | 9/1992 | Simin |
| 6,786,623 B2 | 9/2004 | Snyder et al. |
| 10,215,360 B1* | 2/2019 | Grogan ................. F21S 43/245 |
| 10,266,108 B2 | 4/2019 | Yokoi et al. |
| 10,308,174 B2 | 6/2019 | Chen |

FOREIGN PATENT DOCUMENTS

| CN | 102126462 A | 7/2011 |
| DE | 102016201084 A1 | 7/2017 |
| EP | 2679446 A3 | 1/2014 |
| JP | 6029861 B2 | 11/2016 |
| KR | 19980018164 U | 7/1998 |

* cited by examiner

*Primary Examiner* — Vip Patel
(74) *Attorney, Agent, or Firm* — American Honda Motor Co., Inc.; Mark E. Duell

(57) ABSTRACT

A motor vehicle includes a body component defining a trunk and a trunk gutter, a weather strip attached is a distal end of the trunk gutter, a trunk lid adapted to be disposed in the trunk gutter when in a closed position, and a tail light assembly affixed to the body component. The tail light assembly includes a housing defining an inner surface of the tail light assembly affixed to the body of the motor vehicle by a fastener, a bracket disposed in the housing, a light source affixed to the bracket, an inner lens overlaying the light source, an opaque lens extension extending from a distal end of the inner lens obscuring the bracket and housing from a view rearward of the motor vehicle, and an outer lens overlaying the inner lens and the opaque lens extension.

20 Claims, 5 Drawing Sheets

SECTION A-A

SECTION A-A

TAIL LIGHT ASSEMBLY

TECHNICAL FIELD

The embodiments disclosed herein are related to the field of automotive lighting, and more specifically tail light assemblies for a motor vehicle.

BACKGROUND

In order to improve the flexibility of design options for tail light assemblies for motor vehicles, there is established a need to extend a tail light assembly into a trunk gutter, which improves the design while enabling tail lights to be visible from a 180° field of view, including when a trunk lid, or alternatively a tail gate, is open or closed. This includes improving the styling and visibility of lights into the trunk or tail gate gutter.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a tail light assembly affixed to a body of a motor vehicle includes a housing defining an inner surface of the tail light assembly affixed to the body of the motor vehicle by a fastener, a bracket disposed in the housing, a light source affixed to the bracket, an inner lens overlaying the light source, an opaque lens extension extending from a distal end of the inner lens obscuring the bracket and housing from a view rearward of the vehicle, and an outer lens overlaying the inner lens and the opaque lens extension.

According to another aspect, a tail light assembly adapted to be affixed to a body of a motor vehicle includes a housing defining an inner surface of the tail light assembly affixed to the body of the motor vehicle by a fastener, a bracket disposed in the housing, a light source affixed to the bracket, an inner lens comprising a plurality of angled sections overlaying the light source, an opaque lens extension extending from a distal end of the inner lens obscuring the bracket and housing from a view rearward of the vehicle, wherein the opaque lens extension is disposed in a trunk gutter of the motor vehicle when the tail light assembly is affixed to the body, and an outer lens comprising a plurality of angled sections overlaying the inner lens and one of the plurality of angled sections overlaying the opaque lens extension, wherein the outer lens is disposed rearward of the inner lens and the opaque lens extension when the tail light assembly is affixed to the body of the motor vehicle.

According to yet another aspect, a motor vehicle includes a body component defining a trunk and a trunk gutter, a weather strip attached is a distal end of the trunk gutter, a trunk lid adapted to be disposed in the trunk gutter when in a closed position, and a tail light assembly affixed to the body component. The tail light assembly includes a housing defining an inner surface of the tail light assembly affixed to the body of the motor vehicle by a fastener, a bracket disposed in the housing, a light source affixed to the bracket, an inner lens overlaying the light source, an opaque lens extension extending from a distal end of the inner lens obscuring the bracket and housing from a view rearward of the motor vehicle, and an outer lens overlaying the inner lens and the opaque lens extension.

Figure 1:
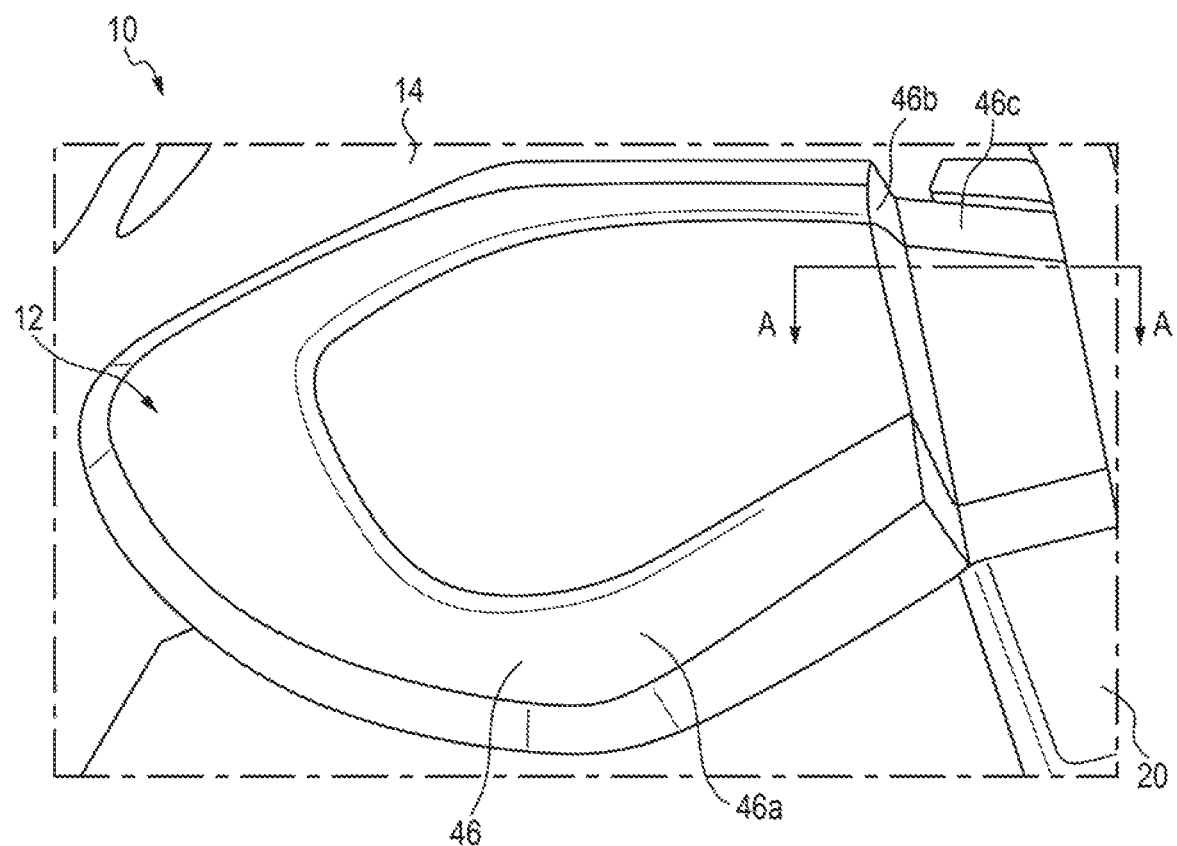
FIG. 1 is a rear view of a portion of a rear of a motor vehicle showing a tail light assembly.
Figure 2:
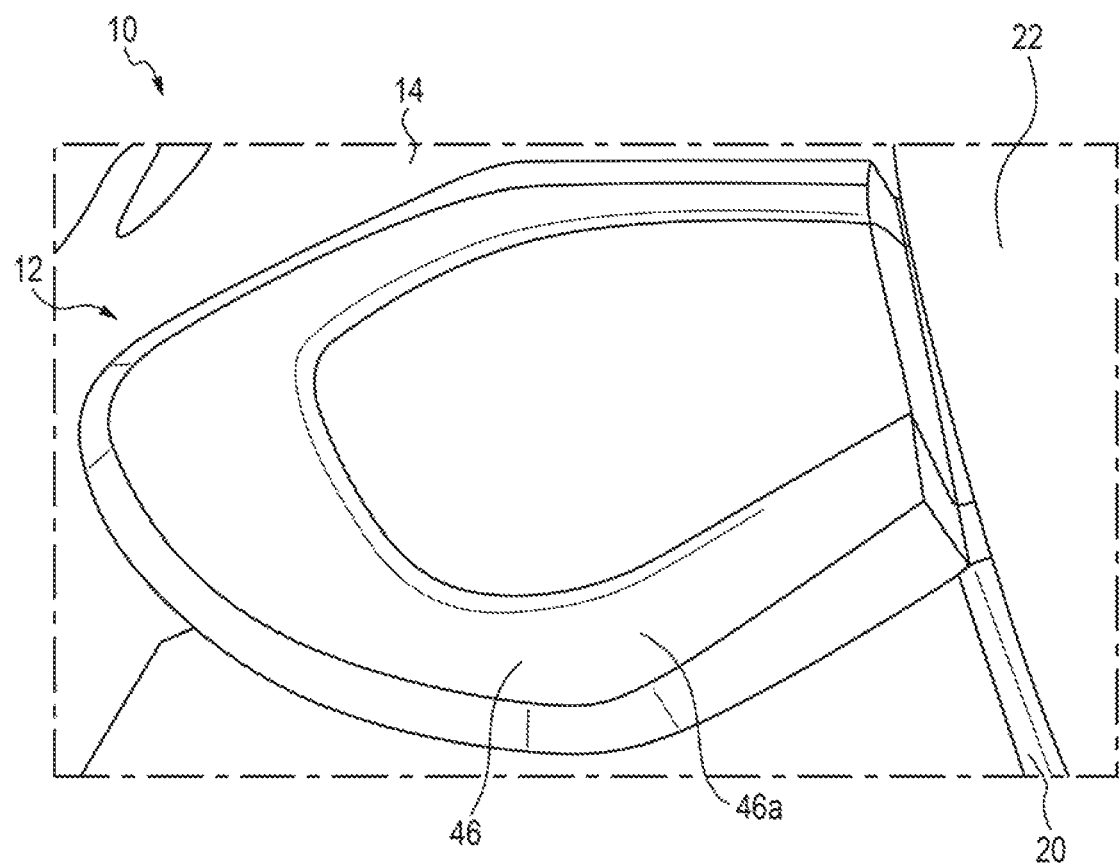
FIG. 2 is a rear view of the portion of the rear of the motor vehicle showing the tail light assembly with the trunk lid is a closed position.
Figure 3:
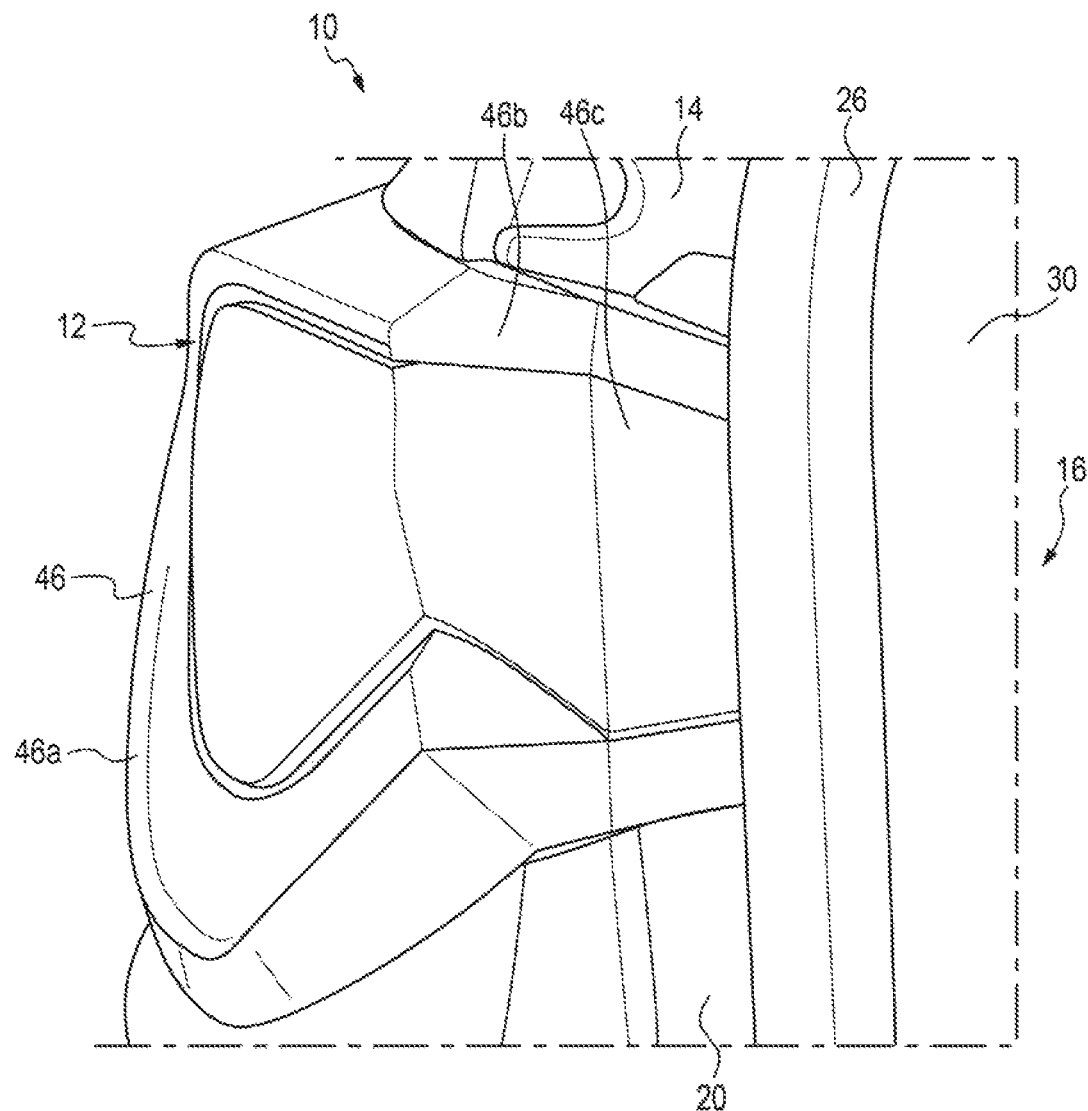
FIG. 3 is a side view of the tail light assembly illustrated in FIG. 1.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

FIGS. 1-5 illustrate a portion of a rear of a motor vehicle 10 including a tail light assembly 12. The tail light assembly 12 is affixed to a body component 14 of the motor vehicle 10. The body component 14 at the rear of the motor vehicle 10 operates to define the exterior of a trunk 16 of the motor vehicle 10. The edge 18 of the body component 14 that defines the opening of the trunk 16 is the trunk gutter 20. The trunk gutter 20 is the portion of the body component 14 that is overlapped by the trunk lid 22 when the trunk lid 22 is in a closed position, illustrated in FIG. 2. The distal edge 24 of the trunk gutter 20 further includes a weather strip 26 that is affixed to the distal edge 24, shown in FIG. 5, by an interference fit with fingers 28 located within the weather strip 26 for sealing the trunk 16 when the trunk lid 22 is in a closed position. The interior of the trunk 16 further includes an inner trunk lining 30, shown in FIG. 3, which is attached to the body component 14.

Figure 4:
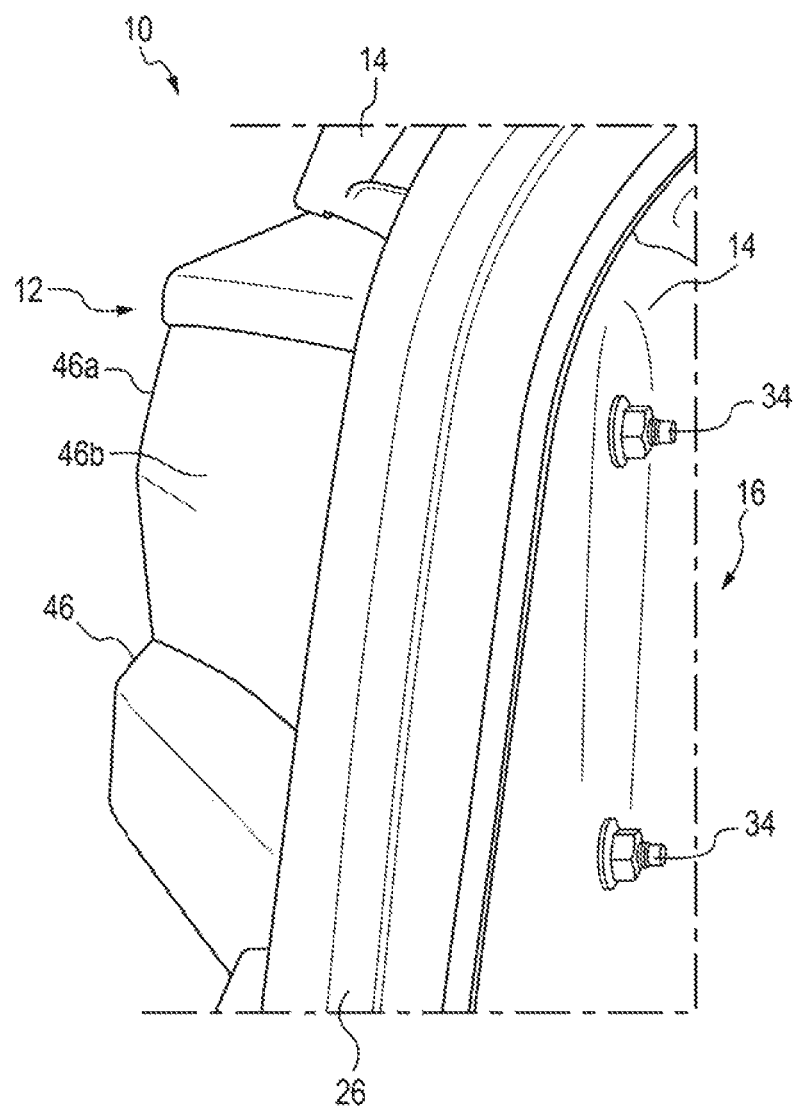
FIG. 4 is an additional side view of the tail light assembly with a trunk lining removed to show a fastener.
Figure 5:
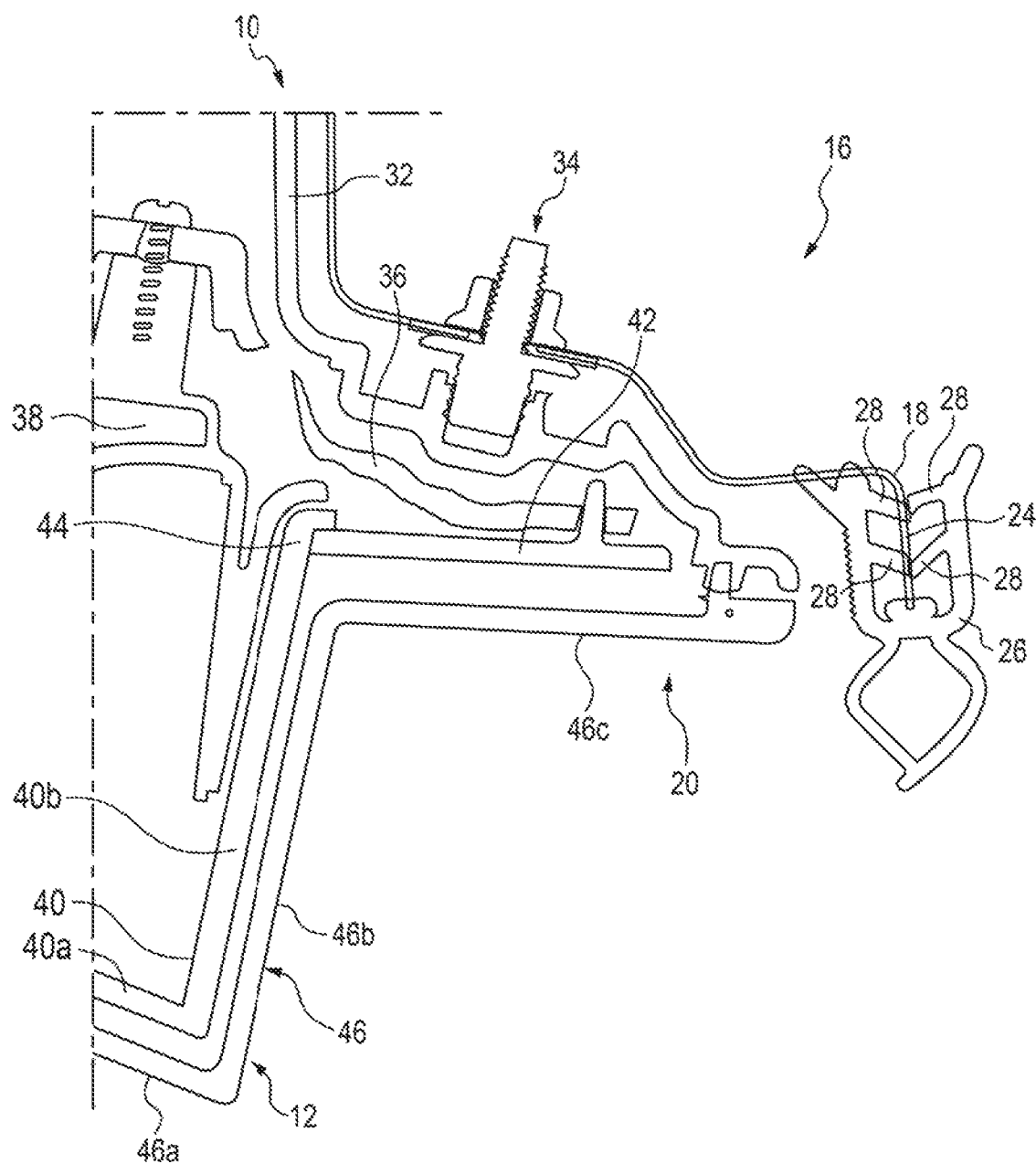
FIG. 5 is a cross-sectional view of the tail light assembly drawn along line A-A in FIG. 1.

The tail light assembly 12, illustrated primarily in FIG. 5, which is a cross section taken along line A-A in FIG. 1, includes a housing 32 defining an inner surface of the tail light assembly 12 that is affixed to the body component 14 of the motor vehicle 10 by a fastener 34. The fastener 34, which may be any suitable fastener 34 such as a nut and bolt fastener, rivet, or other fastener known to those skilled in the art, is also shown in FIG. 4, which is a side view of the tail light assembly 12 with the trunk lining 30 removed to show the fastener 34.

Returning to FIG. 5, the tail light assembly 12 also includes a bracket 36 disposed in the housing 32. The tail light assembly 12 further includes at least one light source 38 affixed to the bracket 36. The light source 38 may be a light emitting diode (LED), light bulb, or any other source of light known in the field of automotive lighting.

The tail light assembly 12 may also include an inner lens 40 overlaying the light source 38 for directing and distributing light from the light source 38. The inner lens 40 includes at least two angled sections 40a, 40b that match the contours of the body component 14. One of the angled sections 40b of the inner lens 40 is disposed in the trunk gutter 20 such that the angled section 40b is covered by the trunk lid 22 when the trunk lid 22 is in a closed position.

The tail light assembly 12 may also include an opaque lens extension 42 that extends laterally at a distal end 44 of the last of the angled sections 40b of the inner lens 40 in the trunk gutter 20 that obscures the bracket 36 and housing 32 from a view rearward of the motor vehicle 10 when the trunk lid 22 is in an open position.

The tail light assembly 12 may further include an outer lens 46 that overlays both the inner lens 40 and the opaque lens extension 42. The outer lens protects the tail light assembly 12 from heat, dirt, moisture, harsh weather, and road elements, while ensuring that the light source 38 remains bright. The outer lens 46 includes at least three angled sections 46a, 46b, 46c that match the contours of the body component 14. Two of the angled sections 46b, 46c of the outer lens 46 are disposed in the trunk gutter 20 such that the angled sections 46b, 46c are covered by the trunk lid 22 when the trunk lid 22 is in a closed position. Angled section 46b of the outer lens 46 overlays angled section 40b of the inner lens 40, and the distal angled section 46c of the outer lens 46 overlays the opaque lens extension 42.

The opaque lens extension 42 and the distal angled section 46c of the outer lens 46 are both disposed in the trunk gutter 20 and are disposed next to the weather strip 26. The arrangement allows for the decorative appearance of outer lens 46 of the tail light assembly 12 to be extended into the trunk gutter 20 to the weather strip 26, thereby allowing for a seamless appearance for the tail light assembly 12 when viewed from the rear of the motor vehicle 10 or near the trunk 16. Further, the opaque lens extension 42 obscures any hardware behind the outer lens 46, such as the housing 32, fastener 34, and bracket 36.

The inner lens 40, outer lens 46, and opaque lens extension 42 may all be constructed of any suitable materials including, but not limited to high durability plastics. The opaque lens extension 42 may be white, gray, or any other suitable color to accentuate the distal angled section 46c of the outer lens 46 that overlays it.

While the invention is described with relation to the trunk 16 and the trunk gutter 20, the embodiments are not limited to use only in a sedan or coupe with a trunk 16. The embodiments may also be applied to any motor vehicle 10, such as a truck, sports utility vehicle, crossover utility vehicle, hatchback vehicle, or any other vehicle that may include a tail gate, a hatchback, or any other type of door in substitute for a trunk 16 and trunk lid 22.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A tail light assembly affixed to a body of a motor vehicle, comprising:
   a housing defining an inner surface of the tail light assembly affixed to the body of the motor vehicle by a fastener;
   a bracket disposed in the housing;
   a light source affixed to the bracket;
   an inner lens overlaying the light source;
   an opaque lens extension extending from a distal end of the inner lens obscuring the bracket and housing from a view rearward of the vehicle; and
   an outer lens overlaying the inner lens and the opaque lens extension.

2. The tail light assembly of claim 1 wherein the opaque lens extension is disposed in a trunk gutter of the motor vehicle.

3. The tail light assembly of claim 2 wherein the inner lens comprises a plurality of angled sections.

4. The tail light assembly of claim 3 wherein the outer lens comprises a plurality of angled sections.

5. The tail light assembly of claim 4 wherein one of the plurality of angled sections of the outer lens is adjacent a weather strip disposed in the trunk gutter of the motor vehicle.

6. The tail light assembly of claim 5 wherein one of the plurality of angled sections of the inner lens is covered by a trunk lid disposed in the trunk gutter when the trunk lid is in a closed position.

7. The tail light assembly of claim 6 wherein at least two of the plurality of angled sections of the outer lens are covered by the trunk lid disposed in the trunk gutter when the trunk lid is in a closed position.

8. The tail light assembly of claim 7 wherein the outer lens is disposed rearward of the inner lens and the opaque lens extension when the tail light assembly is affixed to the body of the motor vehicle.

9. The tail light assembly of claim 1 wherein the fastener comprises a nut and a bolt.

10. A tail light assembly adapted to be affixed to a body of a motor vehicle, comprising:
    a housing defining an inner surface of the tail light assembly affixed to the body of the motor vehicle by a fastener;
    a bracket disposed in the housing;
    a light source affixed to the bracket;
    an inner lens comprising a plurality of angled sections overlaying the light source;
    an opaque lens extension extending from a distal end of the inner lens obscuring the bracket and housing from a view rearward of the vehicle, wherein the opaque lens extension is disposed in a trunk gutter of the motor vehicle when the tail light assembly is affixed to the body; and
    an outer lens comprising a plurality of angled sections overlaying the inner lens and one of the plurality of angled sections overlaying the opaque lens extension, wherein the outer lens is disposed rearward of the inner lens and the opaque lens extension when the tail light assembly is affixed to the body of the motor vehicle.

11. The tail light assembly of claim 10 wherein one of the plurality of angled sections of the outer lens is adjacent a weather strip disposed in the trunk gutter of the motor vehicle.

12. The tail light assembly of claim 11 wherein:
one of the plurality of angled sections of the inner lens is covered by a trunk lid disposed in the trunk gutter when the trunk lid is in a closed position; and
at least two of the plurality of angled sections of the outer lens are covered by the trunk lid disposed in the trunk gutter when the trunk lid is in a closed position.

13. A motor vehicle, comprising:
a body component defining a trunk and a trunk gutter;
a weather strip attached is a distal end of the trunk gutter;
a trunk lid adapted to be disposed in the trunk gutter when in a closed position; and
a tail light assembly affixed to the body component, comprising:
  a housing defining an inner surface of the tail light assembly affixed to the body of the motor vehicle by a fastener;
  a bracket disposed in the housing;
  a light source affixed to the bracket;
  an inner lens overlaying the light source;
  an opaque lens extension extending from a distal end of the inner lens obscuring the bracket and housing from a view rearward of the motor vehicle; and
  an outer lens overlaying the inner lens and the opaque lens extension.

14. The motor vehicle of claim 13 wherein the opaque lens extension is disposed in the trunk gutter.

15. The motor vehicle of claim 14 wherein the inner lens comprises a plurality of angled sections and the outer lens comprises a plurality of angled sections.

16. The motor vehicle of claim 15 wherein one of the plurality of angled sections of the outer lens is adjacent the weather strip disposed in the trunk gutter.

17. The motor vehicle of claim 16 wherein one of the plurality of angled sections of the inner lens is covered by the trunk lid disposed in the trunk gutter when the trunk lid is in a closed position.

18. The motor vehicle of claim 17 wherein at least two of the plurality of angled sections of the outer lens are covered by the trunk lid disposed in the trunk gutter when the trunk lid is in a closed position.

19. The motor vehicle of claim 18 wherein the outer lens is disposed rearward of the inner lens and the opaque lens extension.

20. The motor vehicle of claim 13 wherein the fastener comprises a nut and a bolt.

\* \* \* \* \*